(12) United States Patent
Standish

(10) Patent No.: US 6,941,738 B1
(45) Date of Patent: Sep. 13, 2005

(54) ACTIVE GUARD FOR A LINE TRIMMER

(76) Inventor: Edward B. Standish, 8904, 150th Ave. KPN, Gig Harbor, WA (US) 98329

( * ) Notice: Subject to any disclaimer, the term of this patent is extended or adjusted under 35 U.S.C. 154(b) by 0 days.

(21) Appl. No.: 10/942,232

(22) Filed: Sep. 16, 2004

(51) Int. Cl.[7] ............................................. A01D 34/00
(52) U.S. Cl. ...................................................... 56/12.7
(58) Field of Search ...................... 56/12.7, 239, 320.1, 56/320.2, DIG. 24, 10.7, 12.9, 13.5

(56) References Cited

U.S. PATENT DOCUMENTS

| | | | |
|---|---|---|---|
| 5,010,720 A | | 4/1991 | Corsi |
| 5,107,665 A | | 4/1992 | Wright |
| 5,274,987 A | * | 1/1994 | Wiener ........................ 56/14.8 |
| 5,613,354 A | * | 3/1997 | Foster ......................... 56/16.7 |
| 5,842,331 A | * | 12/1998 | Klee ........................... 56/16.9 |
| 5,924,205 A | | 7/1999 | Sugihara et al. |
| 5,940,973 A | | 8/1999 | Kitz |
| 5,996,234 A | | 12/1999 | Fowler et al. |
| 6,240,714 B1 | * | 6/2001 | Shear ............................ 56/291 |
| 6,324,765 B1 | | 12/2001 | Watkins, Sr. |
| 6,665,942 B2 | | 12/2003 | Richardson et al. |
| 6,691,792 B2 | | 2/2004 | Keane |

* cited by examiner

Primary Examiner—Robert E. Pezzuto
Assistant Examiner—Alicia Torres
(74) Attorney, Agent, or Firm—Dale J. Ream

(57) ABSTRACT

An active guard for use with a line trimmer includes a shield coupled to the trimmer's rotatable shaft casing, a brush member for moving weeds toward the trimmer's cutting line, and a device for transmitting power from the trimmer's rotatable shaft to the brush member for rotating the brush member. The device for transmitting power from the trimmer's rotatable shaft to the brush member includes a belt and pulley assembly or alternately a gear train and a flexible shaft. The top portion of the shield includes upper and lower walls for enclosing the power transmission device. The trimmer's rotatable shaft rotates, and the power transmission device transmits power from the trimmer's rotatable shaft to the brush member, causing the brush member to rotate. The rotating brush member contacts and moves weeds toward the trimmer's cutting line, thus preventing damage to trees and buildings while ensuring that an area is completely trimmed.

20 Claims, 3 Drawing Sheets

ACTIVE GUARD FOR A LINE TRIMMER

BACKGROUND OF THE INVENTION

This invention relates generally to a guard for a line trimmer (often called a "weed trimmer"). In particular, the present invention relates to an active guard for a line trimmer.

The use of gasoline-powered and electric-powered line trimmers for trimming and controlling weeds is widespread. The trimmers are also often employed in situations where an ordinary mower is unsuitable, such as around buildings and trees. Unfortunately, these trimmers can cause considerable damage if used improperly. This damage is perhaps most often inflicted to paint and siding on buildings and to the bark of trees.

Various proposals for passive guards for line trimmers are found in the art. U.S. Pat. Nos. 5,010,720; 5,107,665; 5,924,205; 5,940,973; 5,996,234; 6,324,765; 6,665,942; and 6,691,792 disclose passive guards for line trimmers, many of which are adjustable. Nevertheless, the passive nature of these guards causes a small amount of weeds near buildings and trees to remain untrimmed.

While assumably effective for their intended purposes, the existing devices do not provide an active guard for a line trimmer that both prevents damage to trees and buildings and ensures that an area is completely trimmed by drawing weeds to the line trimmer's cutting line. Therefore, it would be desirable to have a guard for a line trimmer having this capability.

SUMMARY OF THE INVENTION

An active guard for use with a line trimmer according to the present invention includes a shield coupled to the line trimmer's rotatable shaft casing, a brush member for moving weeds toward the line trimmer's cutting line, and means for transmitting power from the rotatable shaft to the brush member for rotating the brush member. The means for transmitting power from the line trimmer's rotatable shaft to the brush member includes a belt and pulley assembly or alternately a gear train and a flexible shaft. The top portion of the shield preferably includes upper and lower walls for enclosing the means for transmitting power.

In use, the line trimmer's rotatable shaft rotates, and the belt and pulley assembly or the gear train and the flexible shaft transmit power from the line trimmer's rotatable shaft to the brush member, causing the brush member to rotate. The rotating brush member contacts and moves weeds toward the line trimmer's cutting line, thus preventing damage to trees and buildings while ensuring that an area is completely trimmed.

Therefore, a general object of this invention is to provide an active guard for a line trimmer that prevents damage to trees and buildings.

Another object of this invention is to provide an active guard for a line trimmer, as aforesaid, that ensures that an area is completely trimmed by drawing weeds to the line trimmer's cutting line.

Still another object of this invention is to provide an active guard for a line trimmer, as aforesaid, that does not require an independent power source.

Yet another object of this invention is to provide an active guard for a line trimmer, as aforesaid, that is lightweight.

A further object of this invention is to provide an active guard for a line trimmer, as aforesaid, that is durable.

A still further object of this invention is to provide an active guard for a line trimmer, as aforesaid, that can be easily and inexpensively manufactured.

Other objects and advantages of this invention will become apparent from the following description taken in connection with the accompanying drawings, wherein is set forth by way of illustration and example, embodiments of this invention.

BRIEF DESCRIPTION OF THE DRAWINGS

FIG. 1a is a perspective view of an active guard for a line trimmer according to the present invention incorporated into a line trimmer;

FIG. 1b is a perspective view on an enlarged scale of the active guard as in FIG. 1a;

DESCRIPTION OF THE PREFERRED EMBODIMENT

Figure 1:
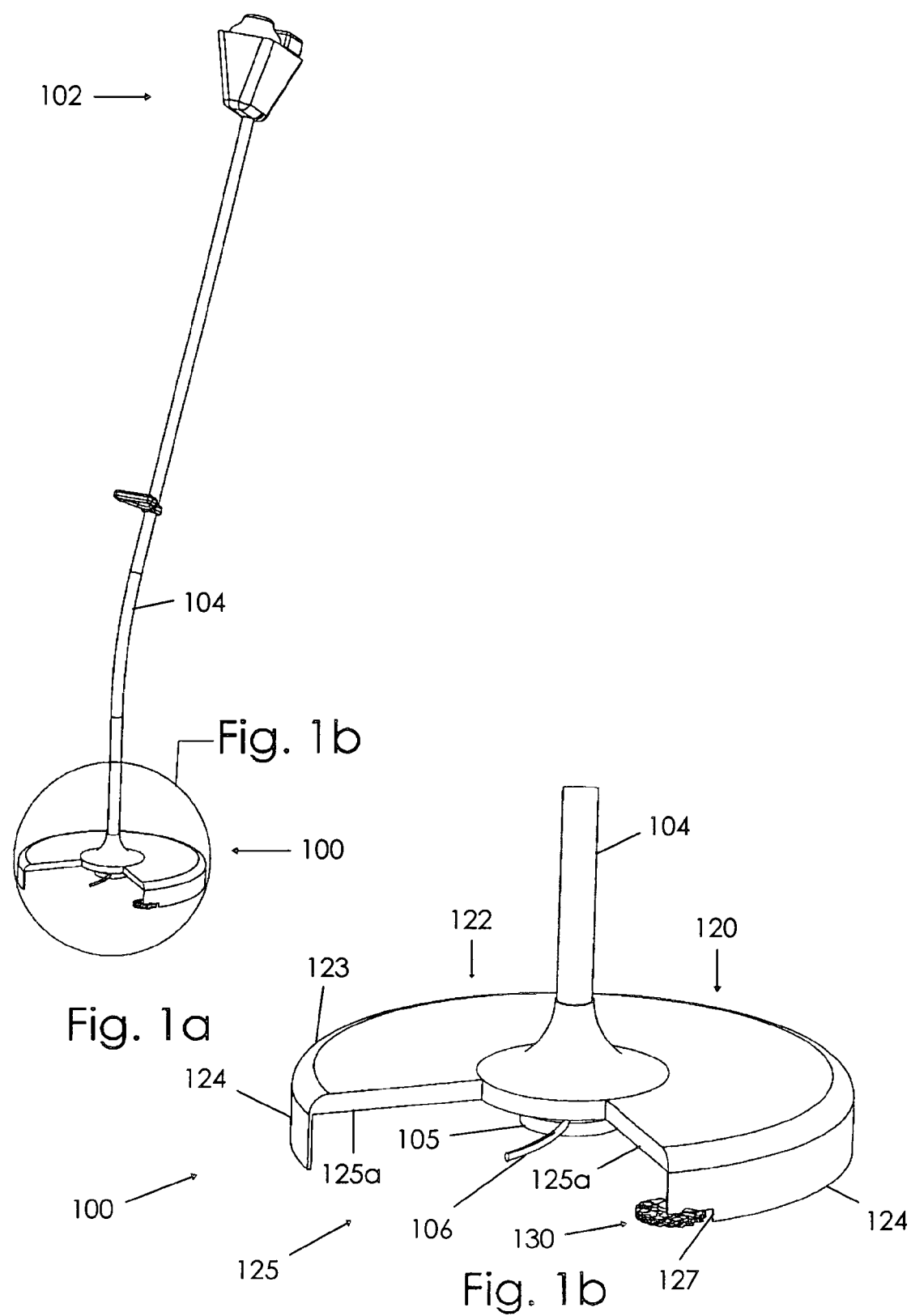

An active guard for a line trimmer according to the present invention will now be described in detail with reference to FIGS. 1a through 2 of the accompanying drawings. More particularly, an active guard 100 for use with a line trimmer 102 having a rotatable shaft 103, a rotatable shaft casing 104, and a cutting head 105 with a cutting line 106 includes a shield 120, a brush member 130, and means 140 for transmitting power from the rotatable shaft 103 to the brush member 130. "Weeds" as used herein refers to weeds as well as other plants, such as grass.

The shield 120 is coupled to the rotatable shaft casing 104 of the line trimmer 102. The shield 120 includes a generally circular top portion 122 and a side portion 124 and defines an open bottom 121 (FIG. 2). The top portion 122 is mounted generally perpendicular to the rotatable shaft casing 104, and the side portion 124 extends downwardly from a peripheral edge 123 of the top portion 122 for guarding objects displaced from the shield 120 from the cutting line 106. The side portion 124 defines an open frontal cutting area 125 (FIG. 1b) bounded by a pair of side walls (each side wall being denoted 125a). A generally circular top portion 122 is preferred but it should be appreciated that other configurations would also work.

Figure 2:
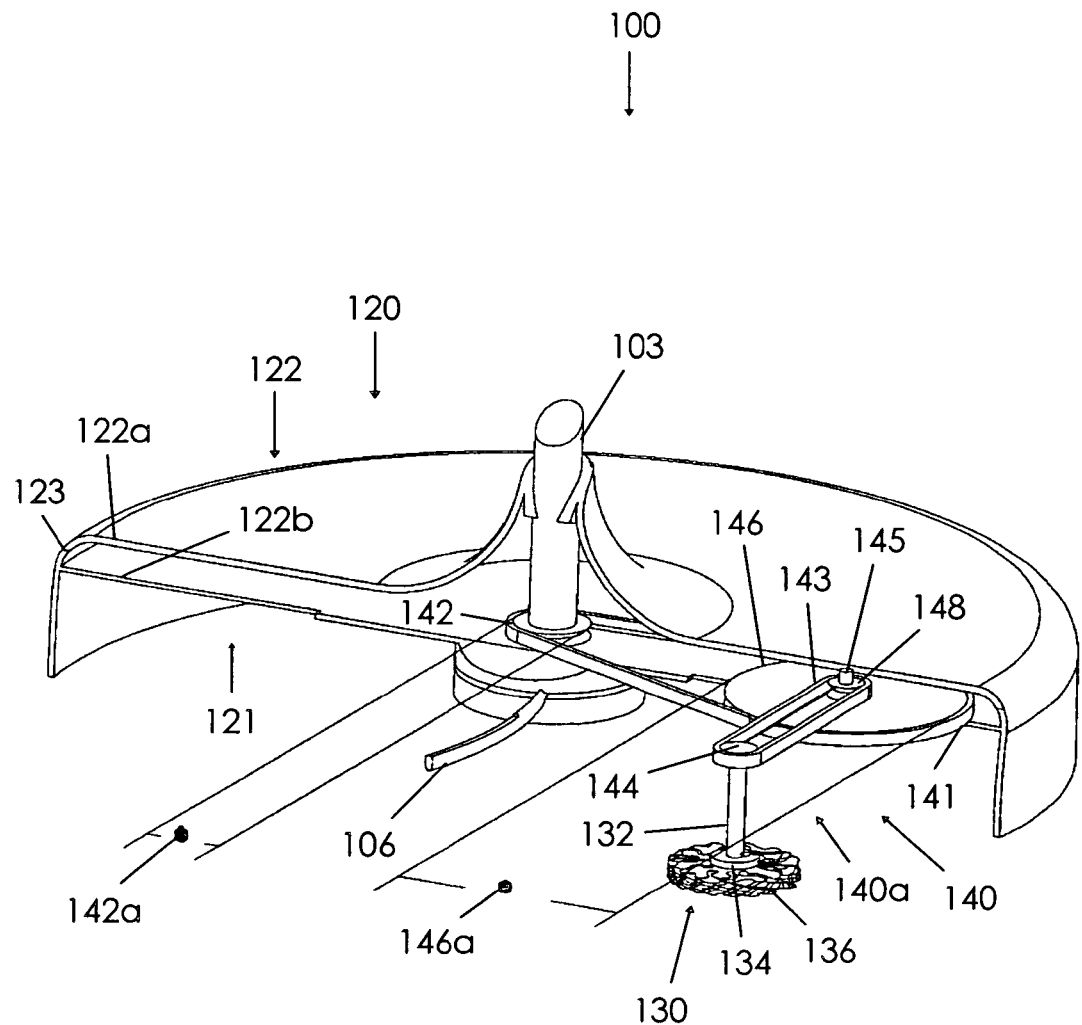
FIG. 2 is a perspective view of the means for transmitting power according to one embodiment of the present invention, shown with portions of the shield removed.

The brush member 130 moves weeds that it contacts toward the cutting line 106 and includes a brush shaft 132, a brush hub 134 attached to the brush shaft 132 for rotation about the brush shaft 132, and brush bristles 136 extending from the brush hub 134 (FIG. 2). The brush shaft 132 is located proximate one of the side walls 125a of the shield 120 and proximate the side portion 124 of the shield 120 (FIG. 1b). The brush shaft 132 is generally vertical relative to the brush hub 134 and is coupled thereto. The side portion 124 of the shield 120 preferably defines an opening 127 for the brush member 130 to extend through (FIG. 1b).

The means 140 for transmitting power from the rotatable shaft 103 of the line trimmer 102 to the brush member 130 for rotating the brush member 130 includes a belt and pulley assembly 140a (FIG. 2). The belt and pulley assembly 140a includes a main pulley 142, an auxiliary pulley 144, a first intermediate pulley 146, a second intermediate pulley 148, and first and second belts 141, 143. The main pulley 142 is attached to the rotatable shaft 103 of the line trimmer 102, and the auxiliary pulley 144 is attached to the brush shaft 132. The first and second intermediate pulleys 146, 148 are attached to an intermediate shaft 145. The first belt 141 connects the main pulley 142 to the first intermediate pulley 146, and the second belt 143 connects the second intermediate pulley 148 to the auxiliary pulley 144. The first intermediate pulley 146 has a first intermediate pulley diameter 146a, and the main pulley 142 has a main pulley diameter 142a. The first intermediate pulley diameter 146a is preferably larger than the main pulley diameter 142a.

The top portion 122 of the shield 120 preferably includes upper and lower walls 122a, 122b for enclosing the means 140 for transmitting power (FIG. 2). In other words, the top portion 122 of the shield 120 preferably includes upper and lower walls 122a, 122b for enclosing the main pulley 142, the auxiliary pulley 144, the first and second intermediate pulleys 146, 148, and the first and second belts 141, 143. It is appreciated, however, that the means 140 for transmitting power may be enclosed by structure separate from the shield 120. The intermediate shaft 145 is rotatably attached to the upper and lower walls 122a, 122b of the top portion 122 of the shield 120.

In use, the rotatable shaft 103 of the line trimmer 102 rotates, causing the main pulley 142 to rotate. The first belt 141 causes the rotation of the main pulley 142 to rotate the first intermediate pulley 146. The first intermediate pulley 146 rotates the intermediate shaft 145 at a lower rotational velocity than the rotational velocity of the rotatable shaft 103 because the first intermediate pulley diameter 146a is larger than the main pulley diameter 142a as discussed above. This reduction is desired because the brush member 130 is not as effective at the higher speed of the rotatable shaft 103. The rotation of the intermediate shaft 145 causes the second intermediate pulley 148 to rotate. The second belt 143 causes the rotation of the second intermediate pulley 148 to rotate the auxiliary pulley 144, which in turn causes the brush shaft 132 to rotate. The brush hub 134 and the brush bristles 136 rotate about the brush shaft 132, with the brush bristles 136 moving weeds that the brush bristles 136 contact toward the cutting line 106 at the open frontal cutting area 125. It is appreciated that it is of course possible to add features to the current invention that allow a user to selectively actuate the brush member 130 or to add additional brush members 130.

Figure 3:
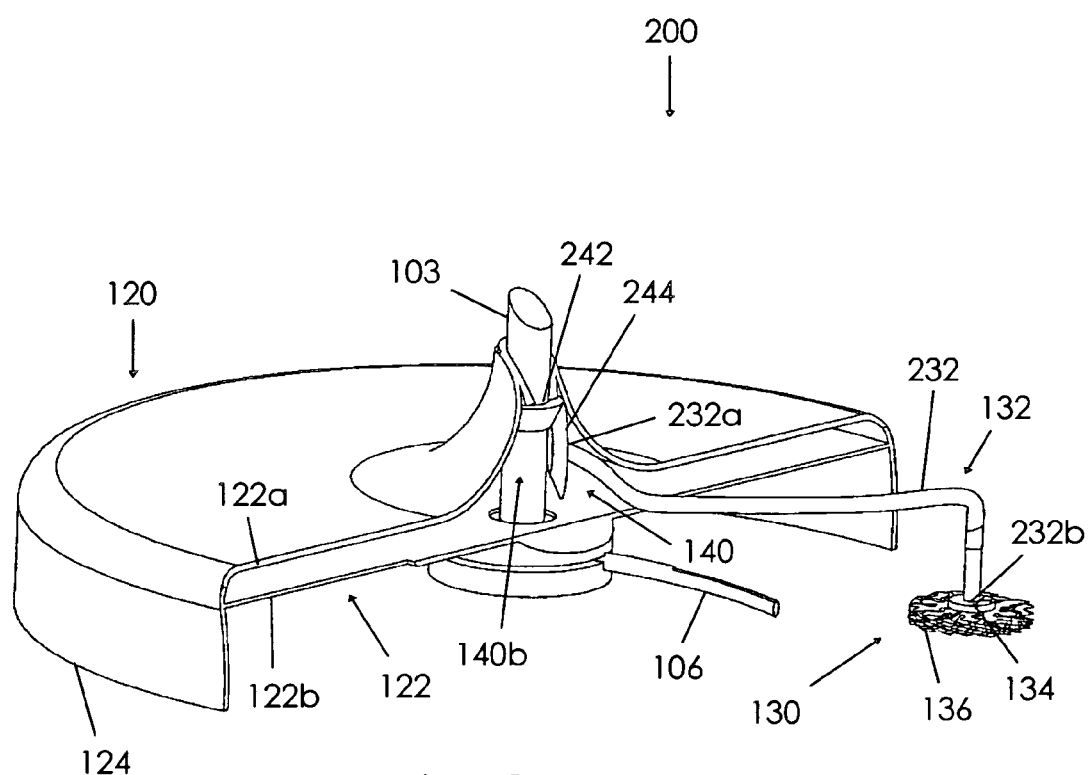
FIG. 3 is a perspective view of the means for transmitting power according to another embodiment of the present invention, shown with portions of the shield removed.

An active guard 200 for a line trimmer according to another embodiment of the present invention is shown in FIG. 3 and includes a construction substantially similar to the construction previously described except as specifically noted below. More particularly, the brush shaft 132 is a flexible shaft 232 having first and second ends 232a, 232b, and the means 140 for transmitting power in an active guard 200 includes a gear train 140b and the flexible shaft 232. The gear train 140b includes first and second bevel gears 242, 244. The first bevel gear 242 is attached to the rotatable shaft 103 of the line trimmer 102. The second bevel gear 244 is coupled to the first end 232a of the flexible shaft 232 and has a configuration complementary to a configuration of the first bevel gear 242 for operative engagement therewith. The second end 232b of the flexible shaft 232 is attached to the brush hub 134. The upper and lower walls 122a, 122b of the top portion 122 of the shield 120 enclose the first and second bevel gears 242, 244 and the flexible shaft 232.

In use, the rotatable shaft 103 of the line trimmer 102 rotates, causing the first bevel gear 242 to rotate. The rotation of the first bevel gear 242 causes the second bevel gear 244 to rotate, which in turn causes the flexible shaft 232 to rotate. The brush hub 134 and the brush bristles 136 rotate about the flexible shaft 232, with the brush bristles 136 moving weeds that the brush bristles 136 contact toward the cutting line 106 at the open frontal cutting area 125 (FIG. 1b).

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. An active guard for use with a line trimmer having a rotatable shaft, a rotatable shaft casing, and a cutting head with a cutting line, said active guard comprising:
   a shield coupled to said rotatable shaft casing of said line trimmer;
   a brush member proximate said shield for moving weeds contacted thereby toward said cutting line; and
   means for transmitting power from said rotatable shaft of said line trimmer to said brush member for rotating said brush member.

2. The active guard as in claim 1, wherein said shield includes:
   a generally circular top portion mounted generally perpendicular to said rotatable shaft casing of said line trimmer, said shield defining an open bottom; and
   a side portion extending downwardly from a peripheral edge of said top portion for guarding objects displaced from said shield from said cutting line, said side portion defining an open frontal cutting area bounded by a pair of side walls.

3. The active guard as in claim 2, wherein:
   said brush member includes a brush shaft, a brush hub attached to said brush shaft for rotation about said brush shaft, and brush bristles extending from said brush hub; and
   said brush shaft is located proximate one said side wall of said shield and proximate said shield side portion, said brush shaft being generally vertical proximate said brush hub.

4. The active guard as in claim 1, wherein said means for transmitting power includes a belt and pulley assembly.

5. The active guard as in claim 1, wherein:
   said brush member includes a brush shaft, a brush hub attached to said brush shaft for rotation about said brush shaft, and brush bristles extending from said brush hub; and
   said means for transmitting power includes a main pulley attached to said rotatable shaft of said line trimmer, an auxiliary pulley attached to said brush shaft, and a belt.

6. The active guard as in claim 1, wherein:
   said brush member includes a brush shaft, a brush hub attached to said brush shaft for rotation about said brush shaft, and brush bristles extending from said brush hub; and
   said means for transmitting power includes a main pulley attached to said rotatable shaft of said line trimmer, a first intermediate pulley attached to an intermediate shaft, a second intermediate pulley attached to said intermediate shaft, an auxiliary pulley attached to said brush shaft, a first belt connecting said main pulley to said first intermediate pulley, and a second belt connecting said second intermediate pulley to said auxiliary pulley.

7. The active guard as in claim 6, wherein:
said first intermediate pulley has a first intermediate pulley diameter;
said main pulley has a main pulley diameter; and
said first intermediate pulley diameter is larger than said main pulley diameter.

8. The active guard as in claim 6, wherein said shield includes:
a generally circular top portion mounted generally perpendicular to said rotatable shaft casing of said line trimmer, said shield defining an open bottom, said top portion including an upper wall and a lower wall for enclosing said main pulley, said first and second intermediate pulleys, said auxiliary pulley, and said first and second belts; and
a side portion extending downwardly from a peripheral edge of said top portion for guarding objects displaced from said shield from said cutting line, said side portion defining an open frontal cutting area bounded by a pair of side walls.

9. The active guard as in claim 8, wherein said intermediate shaft is rotatably attached to said upper and lower walls of said top portion of said shield.

10. The active guard as in claim 8, wherein said side portion of said shield defines an opening for said brush member to extend through.

11. The active guard as in claim 1, wherein said means for transmitting power includes a gear train and a flexible shaft.

12. The active guard as in claim 1, wherein said means for transmitting power includes:
a first bevel gear attached to said rotatable shaft of said line trimmer;
a flexible shaft having first and second ends, said second end being attached to said brush member; and
a second bevel gear coupled to said first end of said flexible shaft and having a configuration complementary to a configuration of said first bevel gear for operative engagement therewith, whereby rotation of said rotatable shaft of said line trimmer rotates said flexible shaft and said brush member.

13. The active guard as in claim 12, wherein said shield includes:
a generally circular top portion mounted generally perpendicular to said rotatable shaft casing of said line trimmer, said shield defining an open bottom, said top portion including an upper wall and a lower wall for enclosing said first and second bevel gears and said flexible shaft; and
a side portion extending downwardly from a peripheral edge of said top portion for guarding objects displaced from said shield from said cutting line, said side portion defining an open frontal cutting area bounded by a pair of side walls.

14. The active guard as in claim 13, wherein said side portion of said shield defines an opening for said brush member to extend through.

15. The active guard as in claim 12, wherein said brush member includes:
a brush hub attached to said flexible shaft for rotation about said flexible shaft; and
brush bristles extending from said brush hub.

16. An active guard for use with a line trimmer having a rotatable shaft, a rotatable shaft casing, and a cutting head with a cutting line, comprising:
a brush member for moving weeds contacted thereby toward said cutting line;
means for transmitting power from said rotatable shaft of said line trimmer to said brush member for rotating said brush member; and
a shield coupled to said rotatable shaft casing of said line trimmer for guarding objects displaced from said shield from said cutting line and for enclosing said means for transmitting power.

17. The active guard as in claim 16, wherein:
said shield includes a generally circular top portion mounted generally perpendicular to said rotatable shaft casing of said line trimmer, said shield defining an open bottom, said top portion including upper and lower walls for enclosing said means for transmitting power;
said shield includes a side portion extending downwardly from a peripheral edge of said top portion for guarding objects displaced from said shield from said cutting line, said side portion defining an open frontal cutting area bounded by a pair of side walls;
said brush member includes a brush shaft, a brush hub attached to said brush shaft for rotation about said brush shaft, and brush bristles extending from said brush hub; and
said brush shaft is located proximate one said side wall of said shield and proximate said shield side portion, said brush shaft being generally vertical proximate said brush hub.

18. The active guard as in claim 17, wherein said means for transmitting power includes:
a main pulley attached to said rotatable shaft of said line trimmer;
a first intermediate pulley attached to an intermediate shaft;
a second intermediate pulley attached to said intermediate shaft;
an auxiliary pulley attached to said brush shaft;
a first belt connecting said main pulley to said first intermediate pulley; and
a second belt connecting said second intermediate pulley to said auxiliary pulley.

19. The active guard as in claim 18, wherein:
said first intermediate pulley has a first intermediate pulley diameter;
said main pulley has a main pulley diameter;
said first intermediate pulley diameter is larger than said main pulley diameter;
said intermediate shaft is rotatably attached to said upper and lower walls of said top portion of said shield; and
said side portion of said shield defines an opening for said brush member to extend through.

20. The active guard as in claim 17, wherein:
said brush shaft is a flexible shaft having first and second ends, said second end being attached to said brush hub;
said means for transmitting power includes a first bevel gear attached to said rotatable shaft of said line trimmer; and
said means for transmitting power includes a second bevel gear coupled to said first end of said flexible shaft and having a configuration complementary to a configuration of said first bevel gear for operative engagement therewith, whereby rotation of said rotatable shaft of said line trimmer rotates said flexible shaft and said brush hub.

* * * * *